(12) United States Patent
Smit et al.

(10) Patent No.: US 10,876,865 B2
(45) Date of Patent: *Dec. 29, 2020

(54) ENCODER SYSTEM FOR POSITION DETERMINATION WITH INCLINED SCALE

(71) Applicant: Rockwell Automation Technologies, Inc., Mayfield Heights, OH (US)

(72) Inventors: Peter M. Smit, Mount Sinai, NY (US); Xikai Sun, Shanghai (CN); Jadav Das, Lake Grove, NY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,167

(22) Filed: Apr. 7, 2020

(65) Prior Publication Data

US 2020/0232826 A1 Jul. 23, 2020

Related U.S. Application Data

(63) Continuation of application No. 15/992,730, filed on May 30, 2018, now Pat. No. 10,612,946.

(51) Int. Cl.
*G01D 5/14* (2006.01)
*G01D 5/347* (2006.01)

(52) U.S. Cl.
CPC ......... *G01D 5/34784* (2013.01); *G01D 5/145* (2013.01); *G01D 5/3473* (2013.01); *G01D 5/34746* (2013.01)

(58) Field of Classification Search
CPC ........... G01D 5/34784; G01D 5/34776; G01D 5/3473; G01D 5/34746; G01D 5/34715; G01D 5/34707; G01D 5/347; G01D 5/14; G01D 5/142; G01D 5/145; G01D 5/56; G01D 5/12

See application file for complete search history.

(56) References Cited

U.S. PATENT DOCUMENTS

| | | |
|---|---|---|
| 4,320,293 A | 3/1982 | Guretzky |
| 4,902,885 A | 2/1990 | Kojima et al. |
| 5,389,780 A | 2/1995 | Anderson |
| 5,650,613 A | 7/1997 | Lewis |
| 5,755,036 A | 5/1998 | Lewis |
| 5,821,517 A | 10/1998 | Fedeli et al. |
| 6,075,297 A | 6/2000 | Izawa et al. |

(Continued)

*Primary Examiner* — John R Lee
(74) *Attorney, Agent, or Firm* — Boyle Fredrickson, SC

(57) ABSTRACT

By configuring an encoder scale as an angled or inclined magnet or pair of oppositely arranged, adjacent magnets, a magnetic field sensor in a travel path of the scale can detect an absolute position of the scale for use in an industrial control system. Due to the angle or incline, when a first side of the scale is proximal to the sensor, the sensor can detect an angle of −180°. As the scale moves to center with respect to the sensor, the sensor can detect an increasing angle to 0°. Then, as a second side of the scale becomes proximal to the sensor, the sensor can detect an increasing angle to +180°. The angle changes linearly with position. In one aspect, the pair of oppositely arranged magnets can be rotated with respect to the travel path to provide the angle. In another aspect, the pair of oppositely arranged magnets can be magnetized diagonally to provide the angle.

18 Claims, 8 Drawing Sheets

(56) References Cited

U.S. PATENT DOCUMENTS

| | | | |
|---|---|---|---|
| 6,118,271 | A | 9/2000 | Ely et al. |
| 6,268,601 | B1 | 7/2001 | Juniman |
| 6,384,405 | B1 | 5/2002 | Kenjo et al. |
| 7,078,677 | B2 | 7/2006 | Chong et al. |
| 8,803,467 | B2 | 8/2014 | Sun |
| 9,121,731 | B2 | 9/2015 | Horiguchi et al. |
| 9,851,225 | B2 | 12/2017 | Gregory et al. |
| 10,161,970 | B2 | 12/2018 | Sun et al. |
| 10,480,961 | B2 * | 11/2019 | Sun .................. G01D 5/2046 |
| 10,612,946 | B2 * | 4/2020 | Smit ................ G01D 5/34776 |
| 10,620,014 | B2 * | 4/2020 | Smit .................... G01D 5/12 |
| 10,620,017 | B2 * | 4/2020 | Sun .................... H02K 11/225 |
| 2003/0085345 | A1 | 5/2003 | Franklin et al. |
| 2004/0227067 | A1 | 11/2004 | Rodi |
| 2005/0179429 | A1 | 8/2005 | Lohberg |
| 2006/0011093 | A1 | 1/2006 | Jensen et al. |
| 2006/0077032 | A1 | 8/2006 | Momose et al. |
| 2007/0278392 | A1 | 12/2007 | Toh et al. |
| 2009/0102460 | A1 | 4/2009 | Schott et al. |
| 2009/0116151 | A1 | 5/2009 | Nakagawa et al. |
| 2011/0043053 | A1 | 2/2011 | Shikayama et al. |
| 2011/0133724 | A1 | 6/2011 | Fukuoka et al. |
| 2012/0007589 | A1 | 1/2012 | Okada |
| 2012/0206081 | A1 | 8/2012 | Sun |
| 2013/0218517 | A1 | 8/2013 | Ausserlechner |
| 2015/0130512 | A1 | 5/2015 | Gustafsson et al. |
| 2016/0041010 | A1 | 2/2016 | Hara et al. |
| 2016/0265941 | A1 | 9/2016 | Mattheis et al. |
| 2018/0216967 | A1 | 8/2018 | Sun et al. |
| 2018/0216968 | A1 | 8/2018 | Sun et al. |
| 2018/0340800 | A1 | 11/2018 | Goto |
| 2019/0368895 | A1 * | 12/2019 | Smit .................. G01D 11/245 |
| 2019/0368903 | A1 * | 12/2019 | Smit .................... G01D 5/145 |

* cited by examiner

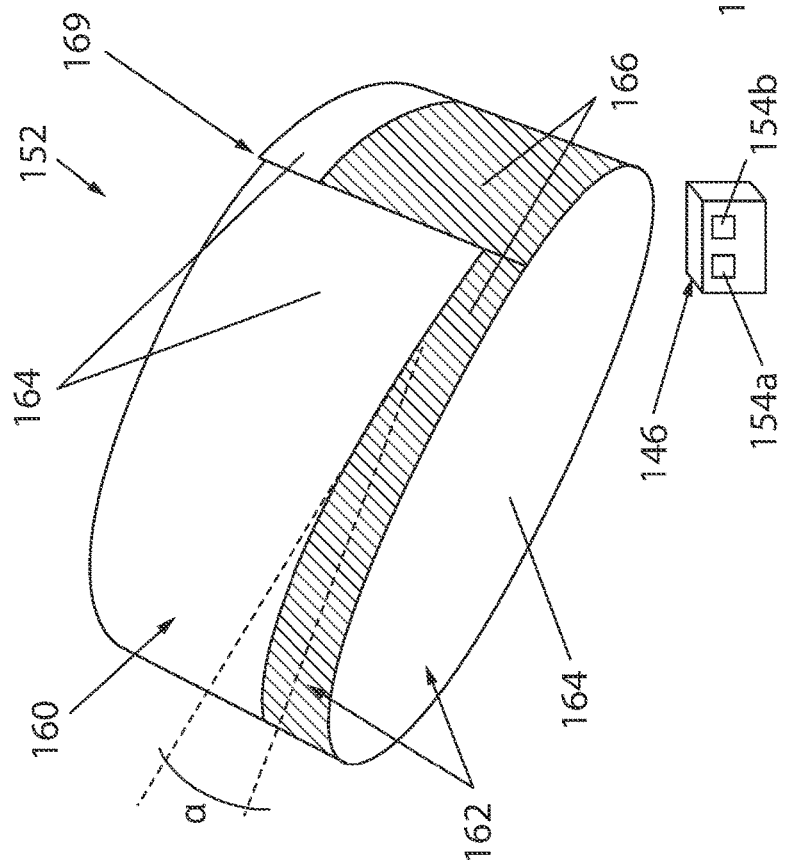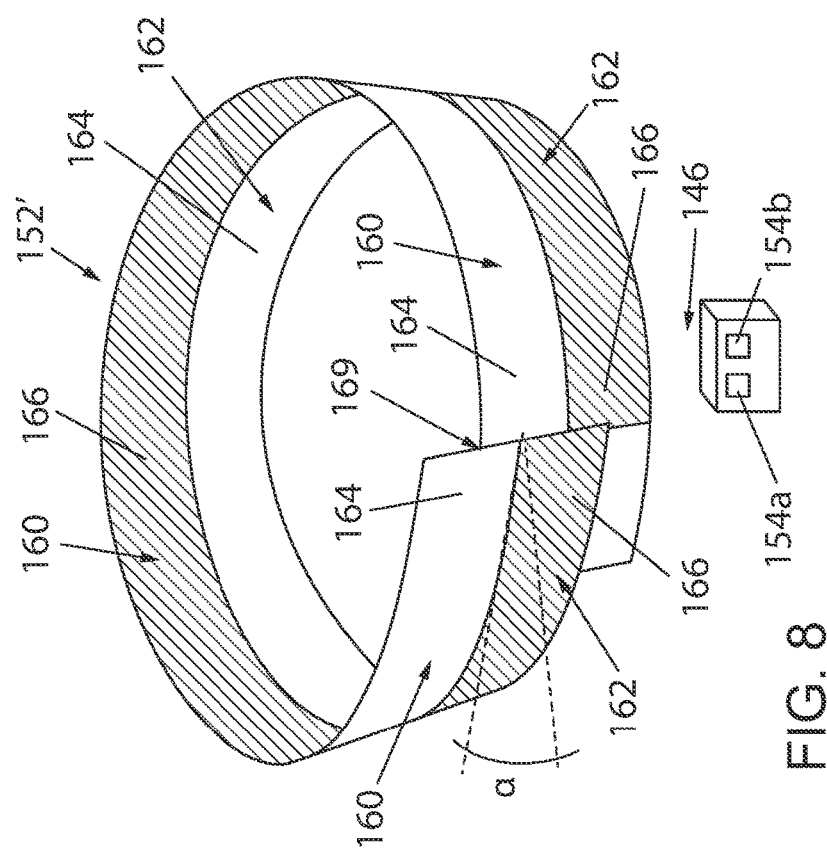

ENCODER SYSTEM FOR POSITION DETERMINATION WITH INCLINED SCALE

FIELD OF THE INVENTION

This application claims priority to U.S. patent application Ser. No. 15/992,730, entitled "Encoder System for Position Determination with Inclined Scale," filed on May 30, 2018, which is herein incorporated by reference.

FIELD OF THE INVENTION

The subject matter disclosed herein relates generally to industrial control systems, and more particularly, to an improved encoder system for position determination in an industrial control system.

BACKGROUND OF THE INVENTION

In industrial control systems, it is often desirable to move objects from one location to another for accomplishing various tasks. For example, rolling conveyors are often used to move objects from one location to another for interacting with different machines of an industrial control process, such as a first machine at a first location for placing a box, a second machine at a second location for filling the box, and a third machine at a third location for closing the box.

More recently, a track system has been developed in which multiple "carts" can be independently driven along a "track" for accomplishing the various tasks of the industrial control process. By providing independently controllable carts, the timing of each task can be more precisely controlled than traditional systems such as rolling conveyors.

In such track systems having moving carts, it is often desirable to know the position of each cart at all times, including during power-up, to ensure that the industrial control process is executing correctly. To accomplish this, each cart can be configured with an encoder scale, such as a magnetic scale, and the track can be configured with arrays of sensors, such as magnetic sensors, with an air gap between the encoder scale and the sensors. In operation, when an encoder scale on a moving cart is near a group of sensors on the track, the sensors can determine the absolute position of the cart by measuring the varying magnetic field strength or varying magnetic field angle from the magnetic encoder scale on the cart. Conversely, when the cart is away from the group of magnetic sensors on the track, the magnetic sensors no longer sense the position magnet of the cart and, in turn, no longer generate output signals having measureable amplitudes. Accordingly, the magnetic sensors can be used to determine absolute positions of carts on the track. It is desirable to improve the aforementioned feedback system.

SUMMARY OF THE INVENTION

By configuring an encoder scale as an angled or inclined magnet or pair of oppositely arranged, adjacent magnets, a magnetic field sensor in a travel path of the scale can detect an absolute position of the scale for use in an industrial control system. Due to the angle or incline, when a first side of the scale is proximal to the sensor, the sensor can detect an angle of $-180°$. As the scale moves to center with respect to the sensor, the sensor can detect an increasing angle to $0°$. Then, as a second side of the scale becomes proximal to the sensor, the sensor can detect an increasing angle to $+180°$. The angle changes linearly with position. In one aspect, the pair of oppositely arranged magnets can be rotated with respect to the travel path to provide the angle. In another aspect, the pair of oppositely arranged magnets can be magnetized diagonally to provide the angle. In other aspects, optical, capacitive or inductive scales could be similarly used.

As used herein, determination of an "absolute" position refers to determining position information for a moving element in a system despite power being removed. Accordingly, with absolute encoders, the position of the encoder (for providing the position of the moving element) is available immediately upon applying power. Absolute position determination and absolute encoders are distinct from "incremental" position determination and incremental encoders as known in the art.

The principle for feedback for the encoder system is analogous to a linear potentiometer which outputs a voltage ramp from 0 to 10 volts proportional to position for encoder travel length. In this way, the encoder system can be like a non-contact magnetic "potentiometer." The scale can be magnetized diagonally, and a magnetic field sensor, such as an Anisotropic Magnetoresistance (AMR) sensor, with a sensing element perpendicular to a magnet in a travel path, can be used to continuously measure magnetic field direction. In an alternative to magnetizing diagonally, a rectangular magnet can be rotated by an angle, such as $10°$. A larger angle can increase resolution but reduce amount of travel, whereas a smaller angle can increase amount of travel but reduce resolution. Accordingly, when the sensor is proximal to various areas of the scale, correspondingly varying angles could be detected. For example, when the sensor is proximal to the left side of the scale, the measured angle could be $-180°$. When the sensor is proximal to the middle of the scale, the measured angle could be $0°$. When the sensor is proximal to the right side of the scale, the measured angle could be $+180°$. The angle can change linearly with position. The encoder system can also be used in a low cost, single-turn absolute rotary encoder. Moreover, with additional gears, a second encoder scale could be added to count revolutions for implementing a multi-turn encoder. This technique could similarly be used for optical, capacitive, inductive and other types of rotary and short stroke linear absolute encoders in which a linear reference between sensors is used for position determination.

In one aspect, the magnets can be permanent magnets made from a ferromagnetic material that is magnetized to create its own persistent magnetic field. The magnets could be, for example, bonded magnets.

Specifically then, one aspect of the present invention can provide an encoder system for position determination, including: an encoder scale having a magnet arranged on its side, the magnet including a magnetic pole pair including a north pole and a south pole; and multiple sensors arranged along a path, each sensor being configured to detect a magnetic field produced from the encoder scale when the encoder scale is nearer to the sensor across a gap, in which the encoder scale and the sensors are configured to move with respect to one another in a direction, and in which the magnetic pole pair of the magnet is maintained at an angle with respect to the direction while the encoder scale and the sensors move with respect to one another.

Another aspect of the present invention can provide an encoder system for position determination, including: an encoder scale having first and second magnets arranged adjacently to one another, in which a magnetic pole pair including a north pole and a south pole of the first magnet is arranged oppositely to a magnetic pole pair including a north pole and a south pole of the second magnet so that the north pole of the first magnet is adjacent to the south pole of the second magnet and the south pole of the first magnet is adjacent to the north pole of the second magnet; and multiple sensors arranged along a path, each sensor being configured to detect a magnetic field produced from the encoder scale when the encoder scale is proximal to the sensor across a gap, in which the encoder scale and the sensors are configured to move with respect to one another in a direction, and in which the magnetic pole pairs of the first and second magnets are maintained at an angle with respect to the direction while the encoder scale and the sensors move with respect to one another.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which:

FIG. 7 is an isometric view of a rotary encoder system for absolute position determination in accordance with an aspect of the invention;

FIG. 8 is an isometric view of an alternative rotary encoder system for absolute position determination in accordance with an aspect of the invention.

DETAILED DESCRIPTION OF THE OF THE INVENTION

Figure 1:
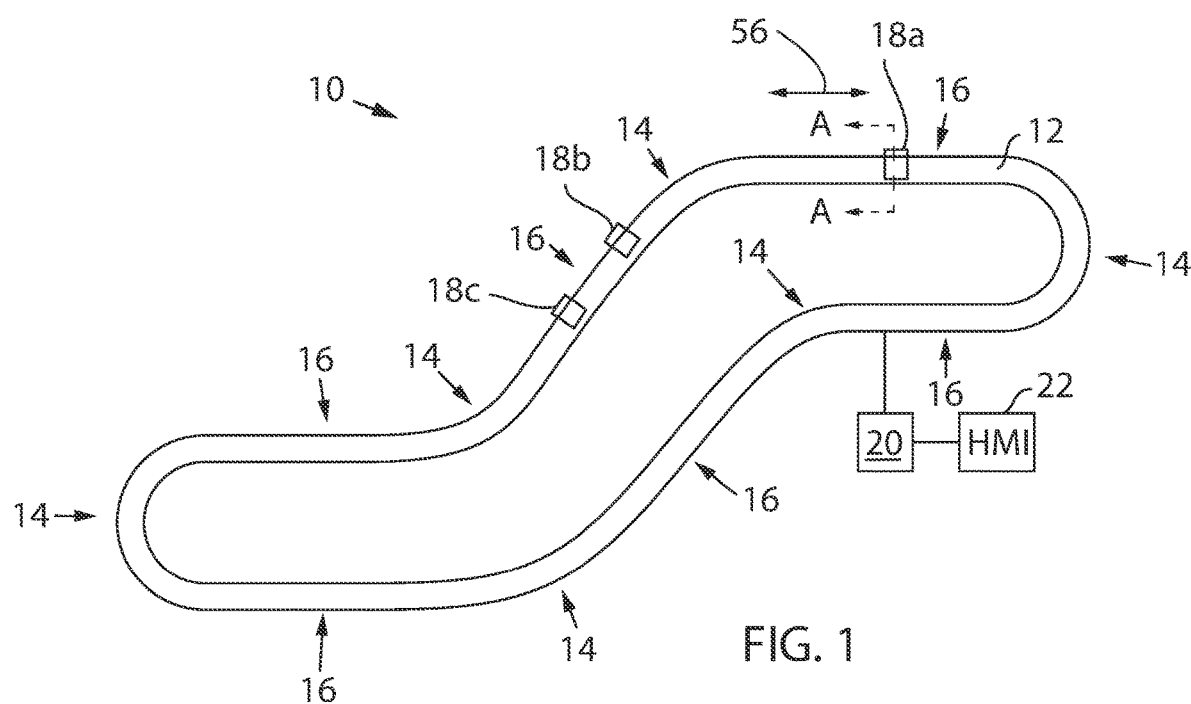
FIG. 1 is an exemplar industrial control system including a track having curved and linear sections and multiple carts for moving objects along the track in accordance with an aspect of the invention.

Referring now to FIG. 1, in accordance with an aspect of the invention, an exemplar industrial control system 10 includes a track 12 having curved sections 14 and linear sections 16. Multiple carts 18, such as carts 18a, 18b and 18c, can be provided for moving objects along the track 12 from one location to another for accomplishing various tasks in the industrial control system 10. The track 12 can be connected to a controller 20, which can include a processor executing a program stored in a non-transient medium, and which can communicate with a Human Machine Interface ("HMI") 22 for providing I/O, for carrying out various aspects of the invention as will be described herein. It will be appreciated that the track 12, being flexibly capable of curved and linear sections according to various geometries, can be configured to implement a wide variety of paths and orientations as may be required in the environment.

Figure 2:
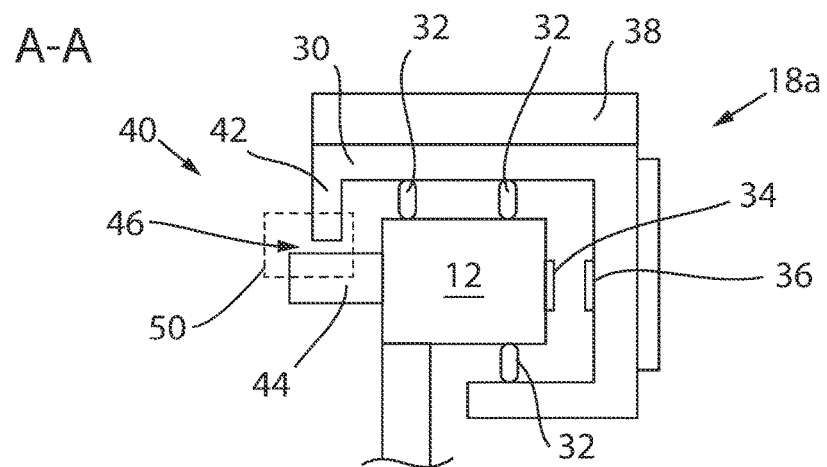
FIG. 2 is a cross sectional view of a cart along the track taken along line A-A of FIG. 1.

With additional reference to FIG. 2, a cross sectional view of a cart 18 along the track 12, such as the cart 18a, taken along line A-A of FIG. 1, illustrates certain aspects of the system. The cart 18 can include a frame 30, which may be aluminum, supporting one or more rollers 32 in communication with the track 12 for moving the cart 18 along the track 12. To move the cart 18, a power winding 34 disposed along the track 12 can be selectively energized to electromagnetically react with a power magnet 36 affixed to the cart 18 to thereby move the cart 18. The cart 18 can include a work area 38 which can be used to accomplish various industrial control functions for moving objects. For determining a position of the cart 18 along the track 12, the system can implement an encoder system 40 including a mover portion 42 which may be part of the cart 18 and a stationary portion 44 provided along the track 12. The mover portion 42 can be arranged to continuously face the stationary portion 44 across a gap 46, which could be preferably a 3 millimeter air gap, as the cart 18 moves along the track 12.

Figure 3A:
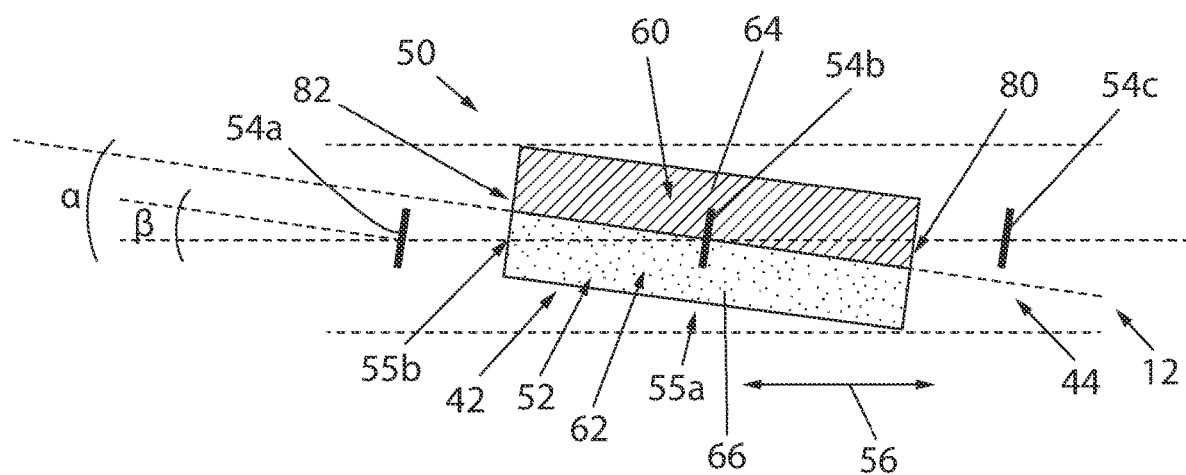
FIG. 3A is a detailed plan view of an encoder system for absolute position determination which could be used in the industrial control system of FIG. 1.
Figure 3B:
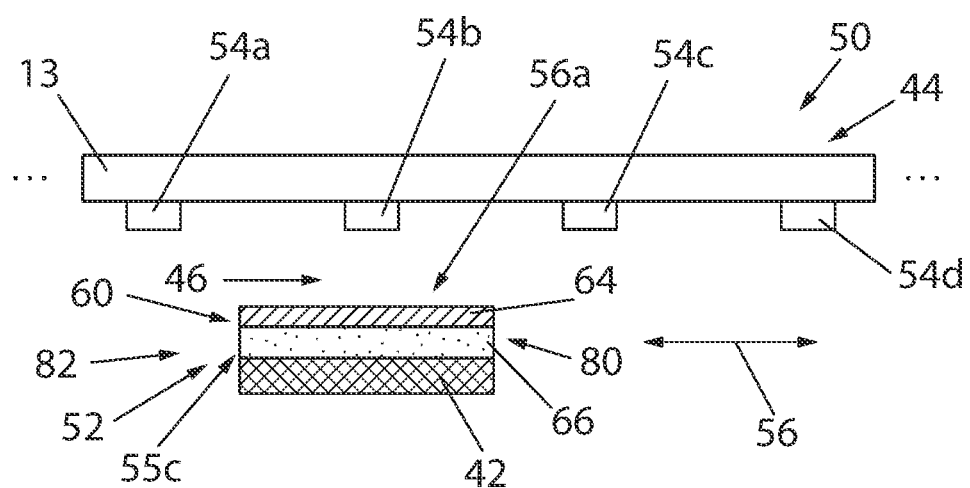
FIG. 3B is a detailed side view of the encoder system of FIG. 3A.

With additional reference to FIGS. 3A and 3B, detailed plan and side views of area 50, respectively, of the mover portion 42 facing the stationary portion 44 across the gap 46 is provided according to an aspect of the invention. The encoder system 40 for position determination can include an encoder scale 52 and multiple sensors 54, such as sensors 54a, 54b and 54c, each sensor having a unique identification corresponding to a relative position in the system. The encoder scale 52 can be attached to the mover portion 42. The sensors 54 can be attached the stationary portion 44, such as via surface mounting to a Printed Circuit Board (PCB) 13, along the track 12, forming a path. The sensors 54 are preferably evenly spaced apart along the path. In one aspect, the encoder scale 52 can comprise a rectangular plate that is 25 millimeters long on a longer first side 55a, which is generally disposed in a direction of travel 56, 10 millimeters wide on a shorter second side 55b, which is generally transverse to the direction of travel 56, and about 1 millimeter thick on a third side 55c, which is perpendicular to the direction of travel 56. The sensors 54 can be spaced apart along the path, for example, by 20 millimeters, in the direction of travel 56.

Figure 4:
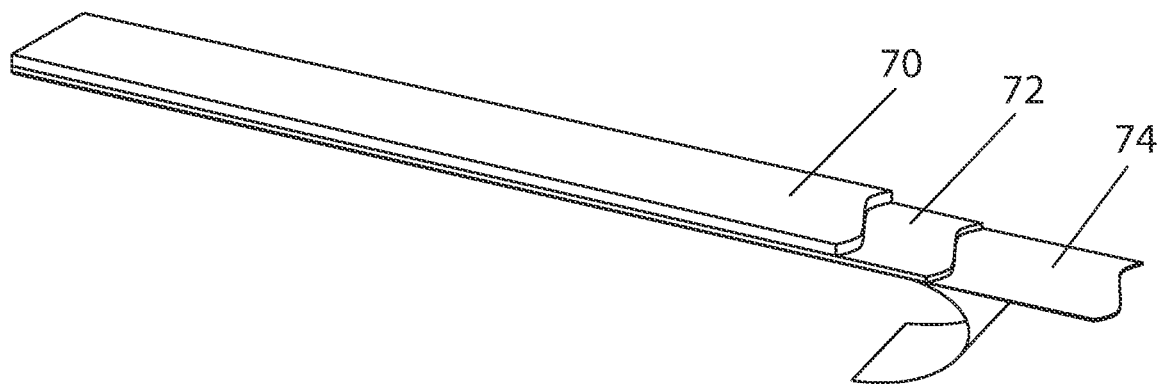
FIG. 4 is an isometric view of a section of magnetic tape which could be used in the encoder system of FIG. 3A.

The encoder scale 52 can include first and second magnets 60 and 62, respectively, arranged adjacently to one another. The magnets can be permanent magnets made from a ferromagnetic material that is magnetized to create its own persistent magnetic field. The magnets could be, for example, bonded magnets. Each of the first and second magnets 60 and 62, respectively, can comprise a magnetic pole pair between sides of the magnet for producing a magnetic field, such as a north pole 64 and a south pole 66 for each magnet, with one pole facing toward the stationary portion 44, and the other pole facing away from stationary portion 44 (see FIGS. 3A and 3B). Accordingly, magnetic pole pairs of the first and second magnets 60 and 62, respectively, can be arranged oppositely to one another. For example, a north pole 64 of the first magnet 60 can be arranged adjacently to a south pole 66 of the second magnet 62, each facing toward the stationary portion 44 across the gap 46, and a south pole 66 of the first magnet 60 can be arranged adjacently to a north pole 64 of the second magnet 62, each facing away from stationary portion 44. With additional reference to FIG. 4, each magnet could comprise, for example, a 1 millimeter thick section of magnetic tape 70, which can be layered over a 0.3 millimeter thick stainless steel carrier tape 72, which can be layered over a 0.13 millimeter thick adhesive tape 74, which can be affixed to the mover portion 42.

The encoder scale 52 and the sensors 54 are configured to move with respect to one another in the direction of travel 56. In one aspect, such as in the industrial control system 10, the encoder scale 52 can move with the mover portion 42 along the track 12 while the sensors 54 remain stationary on the track 12. However, in other aspects, the sensors 54 can move while the encoder scale 52 remains stationary, such as when one or more sensors are on a mover portion and multiple encoder scales are on a stationary portion, or the sensors 54 and the encoder scale 52 can each be configured to move with respect to one another.

The sensors 54 can be magnetic field sensors configured to detect magnetic fields produced from the encoder scale 52 when the encoder scale 52 is proximal to the sensor 54 across the gap 46. In addition, each sensor 54 can be configured to indicate a magnetic field direction produced from the encoder scale 52. The sensors 54 could comprise, for example, Anisotropic Magnetoresistance (AMR) sensors, Tunnel Magneto Resistance (TMR) sensors and/or Hall effect sensors. The sensors 54 can be arranged on the PCB 13 (see FIG. 3B) disposed along the track 12 with sensing elements of the sensors 54 arranged perpendicularly to the PCB 13 and the direction of travel 56.

In accordance with an aspect of the invention, the magnetic pole pairs of the first and second magnets 60 and 62, respectively, can be maintained at an angle or incline with respect to the direction of travel 56, as shown in FIG. 3A, while the encoder scale 52 and the sensors 54 move with respect to one another. By maintaining the encoder scale 52 at an angle or incline, the pair of oppositely arranged, adjacent magnets 60 and 62 can be detected by each sensor 54 with uniquely varying fields for detecting correspondingly varying angles, and determining absolute positions in the system, as the encoder scale 52 moves relative to the sensor 54 in the direction of travel 56.

Figure 5:
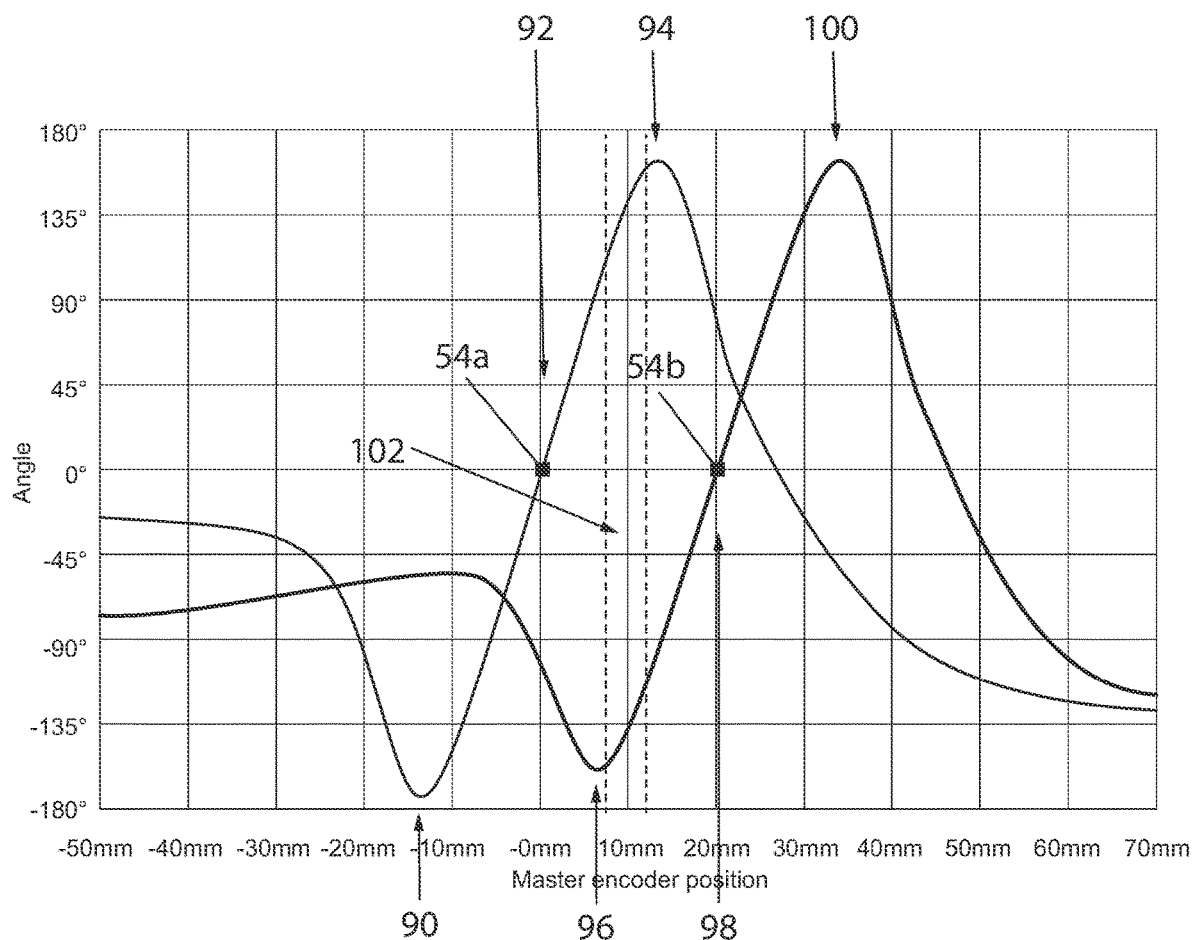
FIG. 5 is a graph illustrating angles indicated by sensors corresponding to positions of an encoder scale for absolute position determination in the encoder system of FIG. 3A.

For example, with additional reference to the diagram of FIG. 5, as the encoder scale 52 moves along the track 12 in one direction, a first end 80 of the encoder scale 52 can first encounter sensor 54a at a first time 90. Due to the angle or incline of the encoder scale 52, when the first end 80 is proximal to the sensor 54a, a larger area of the north pole 64 of the first magnet 60 is presented to the sensor 54a, which can cause the sensor 54a to detect an angle of about −180°. As the encoder scale 52 moves to center with respect to the sensor 54a, equal areas of the poles of the first and second magnets 60 and 62, respectively, become presented to the sensor 54a causing the sensor to detect an increasing angle to about 0° at a second time 92 (centered). Then, as a second end 82 of the scale becomes proximal to the sensor 54a, a larger area of the south pole 66 of the second magnet 62 is presented to the sensor 54a, which can cause the sensor 54a to detect an angle of about +180° at a third time 94. Accordingly, when the encoder scale 52 is proximal to the sensor 54a, the angle indicated by the sensor 54a changes linearly with position of the encoder scale 52. A control system communicating with the sensors 54, such as the controller 20, can thereby determine an absolute position of the encoder scale 52, and therefore the mover portion 42 (and the cart 18), in this linear range between the first and third times 90 and 94, respectively, based on the angle. Moreover, the control system can thereby determine additional characteristics with respect to the encoder scale 52 and the attached mover portion 42, such as direction, velocity, acceleration, and the like, based on the sensed measurements.

Still referring to FIG. 5, continuing with this example, as the encoder scale 52 moves further along the track 12 in the same direction, the encoder scale 52 can then encounter sensor 54b on the first end 80, such as at a fourth time 96 (between the second and third times 92 and 94, respectively). Again, due to the angle or incline of the encoder scale 52, when the first end 80 is proximal to the sensor 54b, the sensor 54b can detect an angle of about −180°. As the encoder scale 52 moves to center with respect to the sensor 54b, the sensor can detect an increasing angle to 0° at a fifth time 98 (centered). Then, as a second end 82 of the scale becomes proximal to the sensor 54b, the sensor 54b can detect an increasing angle to about +180° at a sixth time 100. Accordingly, when the encoder scale 52 is proximal to the sensor 54b, the angle indicated by the sensor 54b also changes linearly with position of the encoder scale 52. Also, in configurations with an encoder scale 52 being long enough to span at least two neighboring sensors 54, the control system can advantageously utilize at least two sensors 54 in a moving overlap region 102 for precisely determining an absolute position of the encoder scale 52 with redundancy by continuously monitoring any two sensors along the track 12.

Referring again specifically to FIG. 3A, in one aspect, the pair of oppositely arranged magnets 60 and 62 (of the encoder scale 52) can be rotated with respect to the travel path (in plane, in the direction of travel 56) to provide the angle α as shown. A larger angle can increase resolution but reduce amount of travel, whereas a smaller angle can increase amount of travel but reduce resolution. In this example, the magnets 60 and 62 are rotated to produce an angle α preferably between 5° and 20°, such as 10°. In addition, one or more sensors 54 (along the track 12) can be maintained at an angle β with respect to the travel path (in plane, in the direction of travel 56). In this example, each sensor 54 could be provided, for example, to maintain an angle β preferably between 5° and 20°, such as 10°. Accordingly, in one aspect, the angle α of the magnets 60 and 62 could be equal to the angle β of sensor 54. Alternatively, the sensors 54 could be straightened (to provide a non-zero angle) while the encoder scale 52 is maintained at the angle or incline.

For example, for the angle α, 5° degrees can have four times the travel as 20°, but resolution may be four times coarser than 20°. At angle α of 25°, a 12 mm long magnet could be used with 10 mm of absolute travel and with 1 micron of resolution. At angle α of 10°, a 30 mm long magnet could be used with 25 mm of absolute travel and with 2.5 microns of resolution. At angle α of 5°, a 60 mm long magnet could be used with 50 mm of absolute travel and with 5 microns of resolution. At angle α of 2.5°, a 120 mm long magnet could be used with 100+ mm of absolute travel and with approximately 10 microns of resolution.

Figure 6:
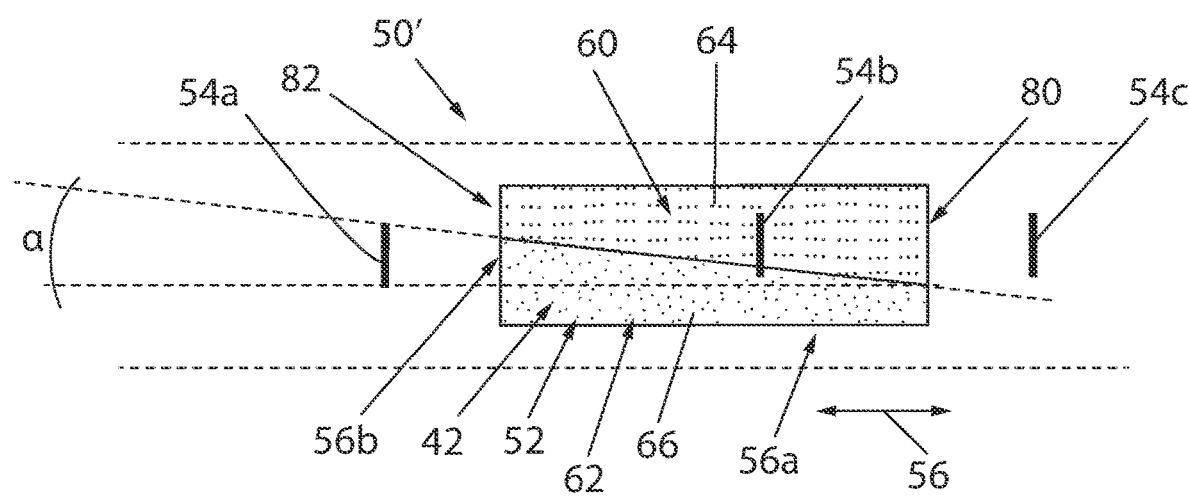
FIG. 6 is a detailed plan view of an alternative encoder system for absolute position determination which could be used in the industrial control system of FIG. 1.

However, in another aspect, the pair of oppositely arranged magnets 60 and 62 (of the encoder scale 52) can be magnetized diagonally to provide the angle α. With additional reference to FIG. 6, where like numerals refer to like parts throughout, in an alternative detailed plan view area 50' of the mover portion 42 facing the stationary portion 44 across the gap 46, analogous to FIG. 3A, the magnets 60 and 62 can be magnetized diagonally with respect to the travel path (in the direction of travel 56) as shown. Accordingly, a larger area of the first magnet 60 can still be presented to sensors 54 at the second end 82 of the scale, while a larger area of the opposite and adjacent second magnet 62 can still be presented to sensors 54 at the first end 80 of the scale. It should be noted that in this example, as shown, the sensors 54 are not provided an angle (the angle β is 0°). However, like the arrangement of FIG. 3, the sensors 54 could also be provided at a non-zero angle.

Although the encoder scale 52 has been illustrated and described as including first and second magnets 60 and 62, respectively, arranged adjacently to one another for ease of understanding, in another aspect, the encoder scale 52' could instead comprise only one magnet arranged on its side, such that a north pole 64 of the single magnet and a south pole 66 of the single magnet are each facing the sensors 54 across the gap 46. In this aspect, the north pole 64 and the south pole 66 of the single magnet would each be seen at an angle in the plan view of FIG. 3A, whereas only one pole of the single magnet, such as the north pole 64 or the south pole 66, would be seen in the side view of FIG. 3B, affixed to the mover portion 42, with lesser thickness.

Also, it should be appreciated that many variations of the invention can not only be implemented for straight and/or curve sections for independent cart systems, but also for low cost short stroke linear encoder systems with absolute position determination and/or low cost, single-turn rotary encoder systems with absolute position determination. Moreover, with additional gears, a second encoder scale could be added to count revolutions for implementing a multi-turn encoder system.

Referring now to FIG. 7, in another aspect of the invention, a rotary encoder system for position determination can include an encoder scale 152 and one or more sensors 154, such as sensors 154a and 154b. The encoder scale 152 can be attached to a rotating portion, such as a drive shaft, while the one or more sensors 154 can be attached to a stationary portion, arranged proximal to the encoder scale 152 across a gap 146, which could be an air gap. The encoder scale 152 can include first and second magnets 160 and 162, respectively, arranged adjacently to one another in a ring. The magnets can be permanent magnets, such as bonded magnets, and could comprise sections of magnetic tape 70 (see FIG. 4). Each of the first and second magnets 160 and 162, respectively, can comprise a magnetic pole pair between inner and outer sides of the magnet for producing a magnetic field, such as a north pole 164 and a south pole 166 for each magnet, with one pole facing an outer side of the ring, toward the one or more sensors 154 when rotated past, and the other pole facing an inner side of the ring, away from the one or more sensors 154. Magnetic pole pairs of the first and second magnets 160 and 162, respectively, can be arranged oppositely to one another in the ring, meeting at a ring junction 169 forming a closed loop. For example, a north pole 164 of the first magnet 160 can be arranged adjacently to a south pole 166 of the second magnet 162, each facing an outer side of the ring, and a south pole 166 of the first magnet 160 can be arranged adjacently to a north pole 164 of the second magnet 162, each facing an inner side of the ring.

The encoder scale 152 and the sensors 154 are configured to move with respect to one another in a rotary direction of travel, such as the encoder scale 152 rotating clockwise or counter-clockwise. The sensors 154 can be magnetic field sensors configured to detect magnetic fields produced from the encoder scale 152 based on the configuration of the encoder scale 152 that is proximal to the sensors 154 across the gap 146. In addition, each sensor 154 can be configured to indicate a magnetic field direction produced from the encoder scale 152. The sensors 154 could comprise, for example, AMR sensors, TMR sensors and/or Hall effect sensors. The sensors 154 can be arranged on a PCB with sensing elements of the sensors 154 arranged perpendicularly to the PCB and the encoder scale 152.

In accordance with an aspect of the invention, the magnetic pole pairs of the first and second magnets 160 and 162, respectively, can be maintained at an angle with respect to the direction of rotation of the encoder scale 152 while the encoder scale 152 and the sensors 154 move with respect to one another. For example, measured at a tangent of the ring, between the magnets 160 and 162 and the direction of rotation, the magnets 160 and 162 can be maintained at an angle α preferably between 5° and 20°, such as 10°, over 360° of the ring. By maintaining the encoder scale 152 at an angle, the pair of oppositely arranged, adjacent magnets 160 and 162 can be detected by each sensor 154 with uniquely varying fields for detecting correspondingly varying angles, and determining absolute positions in the system, as the encoder scale 152 moves relative to the sensor 154 in the direction of rotation.

Similarly, in another aspect, the pair of oppositely arranged magnets 160 and 162 (of the encoder scale 152) can be offset from one another to provide the angle α by offsetting the ring. With additional reference to FIG. 8, where like numerals refer to like parts throughout, in the encoder scale 152', the magnets 160 and 162 can be offset from one another at an angle by offsetting the ring at the ring junction 169. For example, measured at a tangent of the ring, between the magnets 160 and 162 and the direction of rotation, the magnets 160 and 162 can be maintained at an angle α preferably between 5° and 20°, such as 10°, over 360° of the ring. By maintaining the encoder scale 152 at an angle, the pair of oppositely arranged, adjacent magnets 160 and 162 can be detected by each sensor 154 with uniquely varying fields for detecting correspondingly varying angles, and determining absolute positions in the system, as the encoder scale 152 moves relative to the sensor 154 in the direction of rotation. It should be noted that in the examples of FIGS. 7 and 8, as shown, the sensors 154 are not provided an angle (the angle β is 0°). However, like the arrangement of FIG. 3, the sensors 154 could also be provided at a non-zero angle.

Also, although the encoder scale 152 has been illustrated in FIG. 7 and described as including first and second magnets 160 and 162, respectively, arranged adjacently to one another in ring for ease of understanding, in another aspect, the encoder scale 152 could instead comprise only one magnet arranged on its side and twisted into a ring, still maintaining an angle in between the poles, such that a north pole 164 of the single magnet and a south pole 166 of the single magnet are each facing the sensors 154 across the gap 146. In this aspect, the north pole 164 and the south pole 166 of the single magnet would each be seen in the perspective view in the same way as FIG. 7, whereas only the north pole 164 or the south pole 166 of the single magnet would be seen in a side view of the ring (which shows a hole in the center of the ring). In other words, portions of the north and south poles 164 and 166, respectively, of the single magnet would face outward (toward the sensors 154) and inward (toward the center) with respect to the ring.

Similarly, although the encoder scale 152' has been illustrated in FIG. 7 and described as including first and second magnets 160 and 162, respectively, arranged adjacently to one another in ring for ease of understanding, in another aspect, the encoder scale 152' could instead comprise only one magnet arranged on its side and twisted into a ring, still offset to maintain an angle in between the poles, such that a north pole 164 of the single magnet and a south pole 166 of the single magnet are each facing the sensors 154 across the gap 146. In this aspect, the north pole 164 and the south pole 166 of the single magnet would each be seen in the perspective view in the same way as FIG. 7, whereas only the north pole 164 or the south pole 166 of the single magnet would be seen in a side view of the ring (which shows a hole in the center of the ring). In other words, portions of the north and south poles 164 and 166, respectively, of the single magnet would face outward (toward the sensors 154) and inward (toward the center) with respect to the ring.

Figure 9:
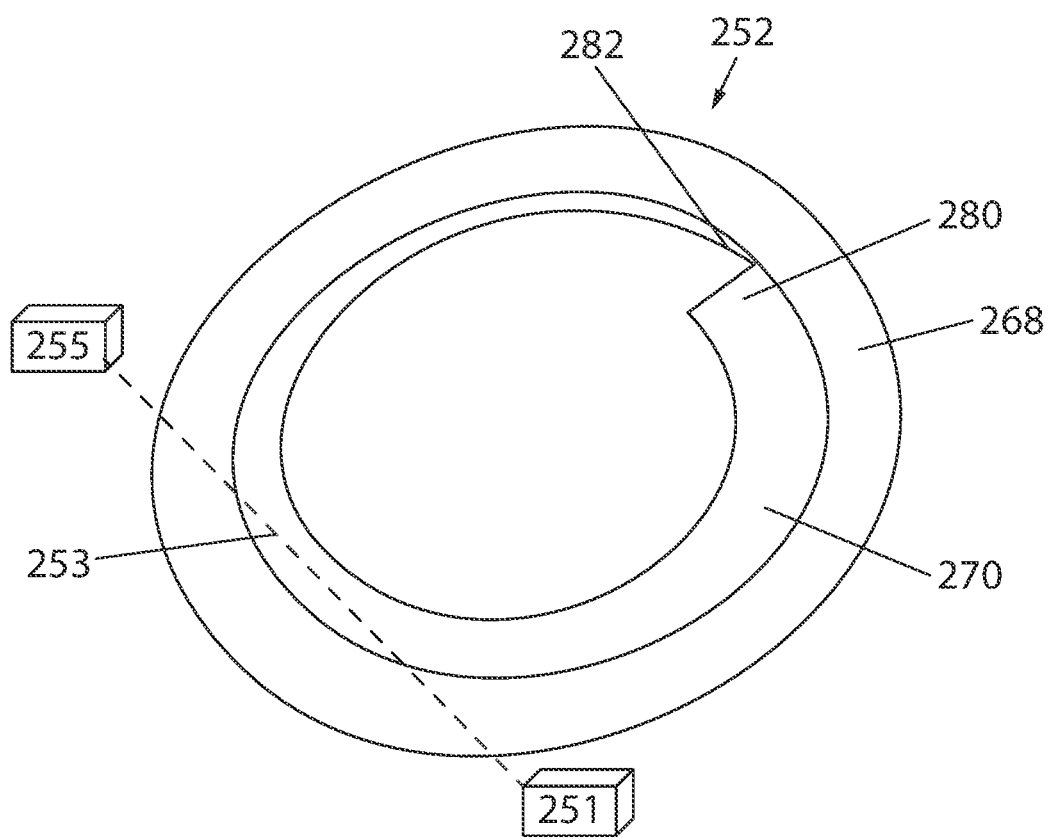
FIG. 9 is an isometric view of an optical rotary encoder system for absolute position determination in accordance with an aspect of the invention.

Referring now to FIG. 9, in another aspect of the invention, an optical encoder system for position determination implementing similar principles can include an optical encoder scale 252 and one or more sensors, such as a light source 251 emitting light 253 that is captured in varying amounts by a photo cell 255 which could comprise one or more photo transistors, photo diodes or the like. The encoder scale 252 can comprise a disk 268 having an opening 270 arranged circumferentially around an interior area. The sensor can be arranged proximal to the encoder scale 252 to detect the light 253 across a gap from the light source 251 through the opening 270. The encoder scale 252 and the sensor can be configured to move with respect to one another, such as the encoder scale 52 being attached to a rotating portion, such as a drive shaft, while the one or more sensors are attached to a stationary portion, arranged proximal to the encoder scale 252 across a gap, which could be an air gap. The opening 270 can gradually decrease in size from a first area 280 of the opening providing a largest area of the opening 270 to a last area 282 of the opening providing a smallest area of the opening 270 in which the first area 280 is arranged adjacently to the last area 282 on the disk 268. In other aspects, encoder systems for position determination implementing similar principles can include capacitive or inductive scales.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A rotary encoder system, comprising:
an encoder scale comprising first and second magnets arranged adjacently to one another in a ring, each of the first and second magnets comprising a magnetic pole pair comprising north and south poles arranged between inner and outer portions of the ring, wherein the magnetic pole pair of the first magnet is arranged opposite to the magnetic pole pair of the second magnet so that the north pole of the first magnet is adjacent to north pole of the second magnet; and
a sensor arranged in proximity to the encoder scale across a gap, the sensor being configured to detect a magnetic field produced from the encoder scale,
wherein the encoder scale and the sensor are configured to move with respect to one another in a rotary direction, and
wherein the magnetic pole pairs of the first and second magnets are maintained at an angle with respect to the rotary direction so that an angle between the first and second magnets measured at a tangent of the ring is maintained.

2. The rotary encoder system of claim 1, wherein the encoder scale is attached to a rotating portion and the sensor is attached to a stationary portion.

3. The rotary encoder system of claim 2, wherein the rotating portion is a drive shaft.

4. The rotary encoder system of claim 1, wherein the gap is an air gap.

5. The rotary encoder system of claim 1, wherein the magnetic pole pair of the first magnet comprises a north pole facing the outer portion of the ring and a south pole facing the inner portion of the ring and the magnetic pole pair of the second magnet comprises a south pole facing the outer portion of the ring and a north pole facing the inner portion of the ring.

6. The rotary encoder system of claim 1, wherein the first and second magnets in the ring meet at a ring junction.

7. The system of claim 1, wherein the first and second magnets are each arranged diagonally with respect to the ring.

8. The system of claim 1, wherein the first and second magnets each comprise a section of magnetic tape.

9. The system of claim 1, wherein the angle is between 5° and 20° over 360° of the ring.

10. The system of claim 1, further comprising a processor in communication with the sensor, wherein the processor executes a program stored in a non-transient medium to locate an absolute position of the encoder scale with respect to the sensor.

11. The system of claim 1, wherein the sensor comprises an Anisotropic Magnetoresistance (AMR), Tunnel Magneto Resistance (TMR) or Hall effect sensor configured to indicate a magnetic field direction produced from the encoder scale.

12. A rotary encoder system, comprising:
- an encoder scale comprising a magnet arranged in a ring, the magnet comprising a magnetic pole pair having north and south poles, wherein each of the north and south poles are arranged to face inner and outer portions of the ring; and
- a sensor arranged in proximity to the encoder scale across a gap, the sensor being configured to detect a magnetic field produced from the encoder scale,
- wherein the encoder scale and the sensor are configured to move with respect to one another in a rotary direction, and
- wherein the magnetic pole pair is maintained at an angle with respect to the rotary direction so that an angle between the north and south poles measured at a tangent of the ring is maintained.

13. The rotary encoder system of claim 12, wherein the encoder scale is attached to a rotating portion and the sensor is attached to a stationary portion.

14. The system of claim 12, wherein the north and south poles are each arranged diagonally in the ring.

15. The system of claim 12, wherein the magnet comprises a section of magnetic tape.

16. The system of claim 12, wherein the angle is between 5° and 20° over 360° of the ring.

17. The system of claim 12, further comprising a processor in communication with the sensor, wherein the processor executes a program stored in a non-transient medium to locate an absolute position of the encoder scale with respect to the sensor.

18. The system of claim 12, wherein the sensor comprises an AMR, TMR or Hall effect sensor configured to indicate a magnetic field direction produced from the encoder scale.

\* \* \* \* \*